E. E. HAUER.
ROTARY MOTOR.
APPLICATION FILED AUG. 1, 1913.

1,102,748.

Patented July 7, 1914.

Witnesses
Grover Ilgen
Floyd McLean

Inventor
Elmer E. Hauer
By Percy Norton
Attorney

UNITED STATES PATENT OFFICE.

ELMER E. HAUER, OF SPRINGFIELD, OHIO, ASSIGNOR TO THE LAGONDA MANUFACTURING COMPANY, OF SPRINGFIELD, OHIO, A CORPORATION OF OHIO.

ROTARY MOTOR.

1,102,748.

Specification of Letters Patent. Patented July 7, 1914.

Application filed August 1, 1913. Serial No. 782,439.

*To all whom it may concern:*

Be it known that I, ELMER E. HAUER, a citizen of the United States, residing at Springfield, in the county of Clark and State of Ohio, have invented certain new and useful Improvements in Rotary Motors, of which the following is a specification, reference being had therein to the accompanying drawings.

My invention relates to rotary motors and more particularly to a motor for driving tube cleaners adapted to travel through a tube with the cleaner, although it may be used for other purposes.

The object of my invention is to provide a compact, efficient and durable motor, and to that end I have devised a motor having a stationary shaft with bearings extending on opposite sides of the rotary motor member arranged to both carry and take the end thrust of said member, and means are provided for efficient lubrication.

With these and other objects in view my invention consists of the constructions and combinations hereinafter described and set forth in the claims.

Figure 1:
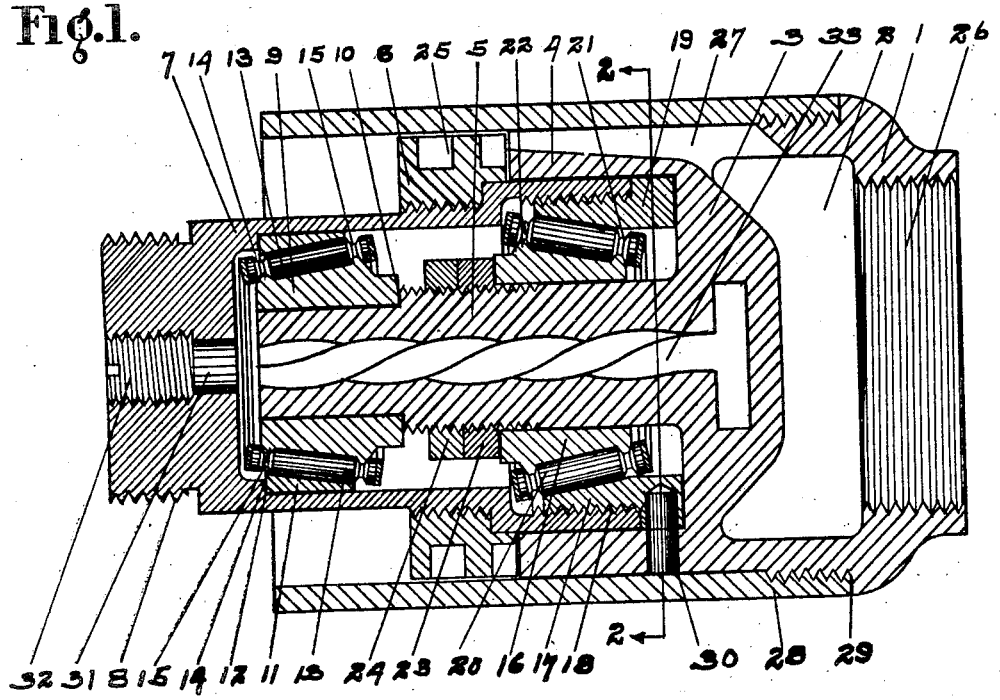
Figure 2:
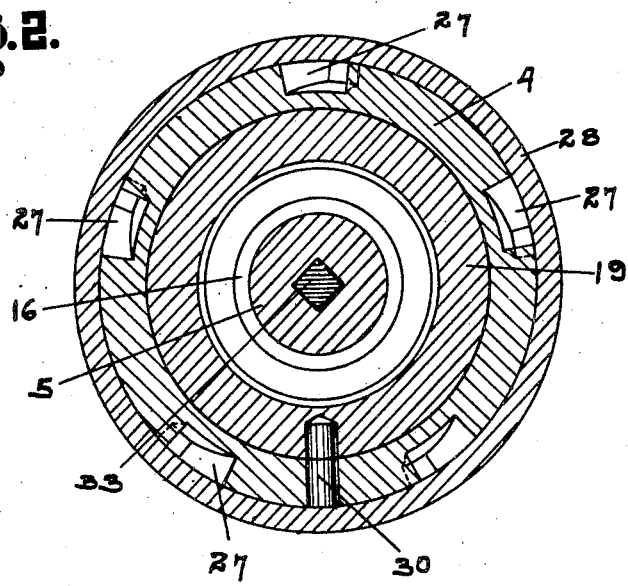

In the accompanying drawings which form a part of this specification Figure 1 is a longitudinal section of a motor embodying my invention and Fig. 2 is a cross-section on the line 2—2 of Fig. 1.

Like numerals represent the same parts in the two views.

In the drawings 1 represents a supply head having a chamber 2 with a wall 3 in front of said chamber. Said wall has a forwardly projecting cylinder 4 and a forwardly projecting shaft 5 and said wall, cylinder and shaft are preferably formed integral with said head. A rotary motor member 6 has a forwardly and rearwardly extending cylinder 7 and the forwardly extending portion is provided with a screw threaded end 8 to attach the tool to be driven. The bearings are mounted upon the stationary shaft and disposed on opposite sides of the rotary member within the respective ends of the cylinder of said member and I preferably employ roller bearings arranged to both carry and take the end thrust of the rotary motor member. These bearings will now be more particularly described. The front bearing has a sleeve 9 pressed on said shaft against a shoulder 10 and a sleeve 11 is seated within the forward end of the cylinder 7 against a shoulder 12. Rollers 13 arranged at an inclination to the axis of the motor between the sleeves 9 and 11 are provided with grooves 14 into which projections 15 of the sleeve 11 extend. The rear bearing has a sleeve 16 pressed on the shaft and a sleeve 17 with screw threads 18 to which the rear end of the cylinder 7 is secured, and is further provided with a flange 19 seated against the front wall 3 of the head. Rollers 20 arranged at an inclination to the axis of the motor between the sleeves 16 and 17 are provided with grooves 21 into which projections 22 of the sleeve 17 extend. A ring or nut 23 screw threaded to the shaft against the sleeve 16 and locked by a nut 24 secures the rear bearing in place; and the cylinder 7 being screw threaded at 18 to the sleeve 17 of the rear bearing, the rotary motor member and front bearing are held in operative position.

The rotary motor member 6 is shown in the form of a turbine screw threaded to the cylinder 7 and is provided with buckets 25. The supply head has a screw threaded opening 26 to the chamber 2 for the attachment of a supply conduit; and ports or passages 27 lead from said chamber through the wall 3 and cylinder 4 and discharge into the buckets 25 of the rotary motor member. A shell or casing 28 screw threaded at its rear end against a shoulder 29 of the head forms the outer wall of said ports or passages and projects forwardly as shown. Said ports or passages are inclined as particularly shown in Fig. 2.

The motor is assembled by first placing the rear bearing and securing it in position on the shaft by the nuts 23 and 24; then place all of the front bearing on the shaft except the sleeve 11; then secure the rotary motor member on its cylinder and place the sleeve 11 of the front bearing in position within the cylinder; then screw the rear end of the cylinder to the sleeve 17 of the rear bearing, inserting a bar in the opening 30 to keep the sleeve from turning; and then secure the casing to the supply head.

It will be seen that when assembled the interior of the cylinder becomes a closed chamber in which the bearings are disposed and this chamber is supplied with lubricant through an opening 31 having a screw plug 32 to close the same. The motor operates at a very high speed and it is essential that it be well lubricated and the arrangement as described affords ample means for the efficient lubrication of the motor. To strengthen the shaft 5 where it projects from the wall 3 a piece of wrought iron or steel 33 is embedded within the casting.

Having thus described my invention I claim:—

1. In a rotary motor, a supply head having a forwardly projecting stationary shaft, a rotary motor member having a bearing on said shaft arranged to both carry and take the end thrust of said member and means to maintain said member in operative position, said means abutting said bearing and arranged to take up the wear from both the radial and end thrust in said bearing, substantially as described.

2. In a rotary motor, a supply head having a chamber with a wall in front of said chamber having ports therethrough and a central forwardly projecting shaft, said wall and shaft being formed integrally with said head, a rotary motor member having a forwardly and rearwardly extending cylinder with removable bearings for the respective ends thereof mounted on said shaft and means to adjust one of said bearings to take up wear, substantially as described.

3. In a rotary motor, a supply head having a chamber with a wall in front of said chamber having ports therethrough and a central forwardly projecting shaft, said wall and shaft being formed integrally with said head and a rotary motor member having a forwardly and rearwardly extending cylinder with removable bearings for the respective ends thereof mounted on said shaft and means to maintain the same thereon, substantially as described.

4. In a rotary motor, a supply head having a chamber with a wall in front of said chamber having ports therethrough and a central forwardly projecting shaft, said wall and shaft being formed integrally with said head and a rotary motor member having a forwardly and rearwardly extending cylinder with removable bearings for the respective ends thereof mounted on said shaft and means to maintain the same thereon, said bearings being arranged to both carry and take the end thrust of said rotary motor member, substantially as described.

5. In a rotary motor, a supply head having a chamber with a wall in front of said chamber having ports therethrough and a central forwardly projecting shaft, said wall and shaft being formed integrally with said head and a rotary motor member having a forwardly and rearwardly extending cylinder with roller bearings for the respective ends thereof mounted on said shaft, one of said bearings being arranged to take the end thrust in one direction and the other bearing being arranged to take the end thrust in the opposite direction and means to maintain said rotary member in operative position, substantially as described.

6. In a rotary motor, a supply head having a chamber with a wall in front of said chamber having a forwardly projecting cylinder and a forwardly projecting shaft, said wall, cylinder and shaft being formed integrally with said head with ports through said wall and cylinder and a removable bearing seated in a bearing chamber formed between said cylinder and shaft, means to hold said bearing in position, a rotary motor member having a cylinder projecting into said bearing chamber and carried by the bearing therein, said bearing being arranged to hold said rotary motor member in operative position and to take the forward thrust thereof, substantially as described.

7. In a rotary motor, a supply head having a chamber with a wall in front of said chamber having a forwardly projecting cylinder and a forwardly projecting shaft, said wall, cylinder and shaft being formed integrally with said head and with ports through said wall and cylinder, a rotary motor member having a forwardly and rearwardly extending cylinder, bearings carried by said shaft within said cylinder on opposite sides of said rotary motor member and means to maintain said rotary motor member in operative position, substantially as described.

8. In a rotary motor, a supply head having a transverse wall with a central forwardly projecting shaft, a rotary motor member having a forwardly and rearwardly extending cylinder, bearings within said cylinder mounted on said shaft, means to close the ends of said cylinder and means to introduce a lubricant thereto, substantially as described.

9. In a rotary motor, a supply head having a transverse wall with a shaft projecting forwardly therefrom, a rotary motor member having a forwardly and rearwardly extending cylinder, a front bearing seated between a shoulder in said cylinder and a shoulder on said shaft and a rear bearing seated at one end against said transverse wall and means abutting the other end to secure it in position, substantially as described.

10. In a rotary motor, a supply head having a transverse wall with a forwardly projecting shaft cast integrally therewith, said wall and shaft having embedded therein a piece of wrought iron or steel, substantially as described.

In testimony whereof I have hereunto affixed my signature in the presence of two witnesses.

ELMER E. HAUER.

Witnesses:
 FLOYD McKEAN,
 GROVER ILGEN.